| United States Patent [19] | [11] Patent Number: 5,044,797 |
|---|---|
| Walker et al. | [45] Date of Patent: Sep. 3, 1991 |

[54] DEVICE FOR CONNECTING A TIMING BELT TO A PRINTHEAD CARRIAGE

[75] Inventors: Alan H. Walker, Barton; RObert A. Brull, Dryden, both of N.Y.

[73] Assignee: NCR Corporation, Dayton, Ohio

[21] Appl. No.: 176,576

[22] Filed: Apr. 1, 1988

[51] Int. Cl.$^5$ ............................................. B41J 19/20
[52] U.S. Cl. .................................... 400/335; 400/320
[58] Field of Search ................ 400/320, 354, 335, 352

[56] References Cited

U.S. PATENT DOCUMENTS

| 3,795,766 | 3/1974 | Farlow | 178/6.6 R |
| 4,300,847 | 11/1981 | Hoffman et al. | 400/196.1 |
| 4,444,521 | 4/1984 | Rickard et al. | 400/120 |
| 4,452,542 | 6/1984 | Akazawa | 400/175 |
| 4,459,054 | 7/1984 | Dollenmayer | 400/185 |
| 4,549,825 | 10/1985 | Fish, III et al. | 400/692 |
| 4,576,496 | 3/1986 | Schwarz et al. | 400/352 |
| 4,609,299 | 9/1986 | Hattori et al. | 400/229 |
| 4,613,246 | 9/1986 | Sugiura et al. | 400/320 |

FOREIGN PATENT DOCUMENTS

| 87085 | 5/1985 | Japan | 400/120 |
| 248265 | 11/1986 | Japan | 400/352 |

OTHER PUBLICATIONS

IBM Tech. Disc. Bulletin, "Self Aligning Belt Clamp Mechanism", Jennings, vol. 26, No. 3B, Aug. 1983, pp. 1578-1579.
IBM Tech. Disc. Bulletin, "Improved Method of Belt Attachment in a Belt Escopement System", vol. 28, No. 9, Feb. 1986, pp. 4021-4022.

Primary Examiner—Edgar S. Burr
Assistant Examiner—C. Bennett
Attorney, Agent, or Firm—Wilbert Hawk, Jr.; Albert L. Sessler, Jr.

[57] ABSTRACT

A device for connecting a toothed timing belt to a printhead carriage includes an arcuate member and a pair of posts extending downwardly from the carriage. The arcuate member includes a generally concave surface and a generally convex surface which is complementary to the toothed configuration of the timing belt. The posts are provided with angled surfaces located adjacent to the convex surface of the arcuate member to define passageways into which the belt is placed. Ledges at the lower ends of the posts prevent unintended slippage of the belt from the device when the belt is not under tension.

8 Claims, 4 Drawing Sheets

DEVICE FOR CONNECTING A TIMING BELT TO A PRINTHEAD CARRIAGE

BACKGROUND OF THE INVENTION

In the field of matrix printers, a printer for printing on record media may include one or more printheads which are customarily secured to a carriage which in turn is commonly supported on one or more rails for movement in a reciprocating manner across the printer for printing horizontally and serially across the record media. Each of the printheads may include a plurality of elements supported in a group and actuated or energized at high speed to cause printing of dots by the movement of dot-making elements, including droplets of ink or print wires attached to solenoids which are caused to be impacted against the record media. The printhead and carriage may be moved on the rails by any of several arrangements, such as a cable and pulley combination, a lead screw, a cam drive or an endless toothed drive belt. In this manner, a line of printed characters is completed upon travel of the printhead in one direction across the paper. In the case of the endless drive belt, it is desirable to provide a device for connecting the belt to the carriage which is easily connected and disconnected, economical, reliable, and which does not require cutting of the belt.

SUMMARY OF THE INVENTION

The present invention relates to a printer and more particularly relates to a device for connecting a timing belt to a printhead carriage.

In accordance with one embodiment of the invention, a printer for serial printing of indicia on record media comprises a printhead; a carriage to which said printhead is secured; supporting means on which said carriage moves for bringing the printhead successively into operative relation with different portions of the record media; toothed belt means for driving said carriage in transverse movement; drive means for driving said belt means; and belt engaging means on said carriage for securing the carriage to the belt means to cause said carriage to be driven by said belt means, said belt engaging means comprising an arcuate segment having a surface complementary to the teeth on said belt means for engagement therewith; a pair of posts, each post having two ends and being secured at one of said ends to said carriage, one of said posts being positioned to either side of the arcuate segment; and a pair of ledges, one ledge secured to the other end of each post in perpendicular relationship to said post, said ledges being spaced from said carriage, said posts and said segment defining a passageway therebetween for entry and removal of the toothed belt means, each ledge extending under said passageway, so that when said belt means is not under tension, it is retained in position by the ledges on the posts against movement in a direction away from the carriage.

It is accordingly an object of the present invention to provide a device for connecting a timing belt to a printhead carriage.

Another object is to provide a device which permits quick and easy engagement with and disengagement from a printhead carriage of a drive belt.

Another object is to provide a device for securing a toothed timing belt to a printhead carriage, which device is self-retaining without the need for use of adhesives or clamps.

With these and other objects, which will become apparent from the following description, in view, the invention includes certain novel features and combinations, a preferred form or embodiment of which is hereinafter described with reference to the drawings which accompany and form a part of this specification.

DESCRIPTION OF THE PREFERRED EMBODIMENT

Figure 1:
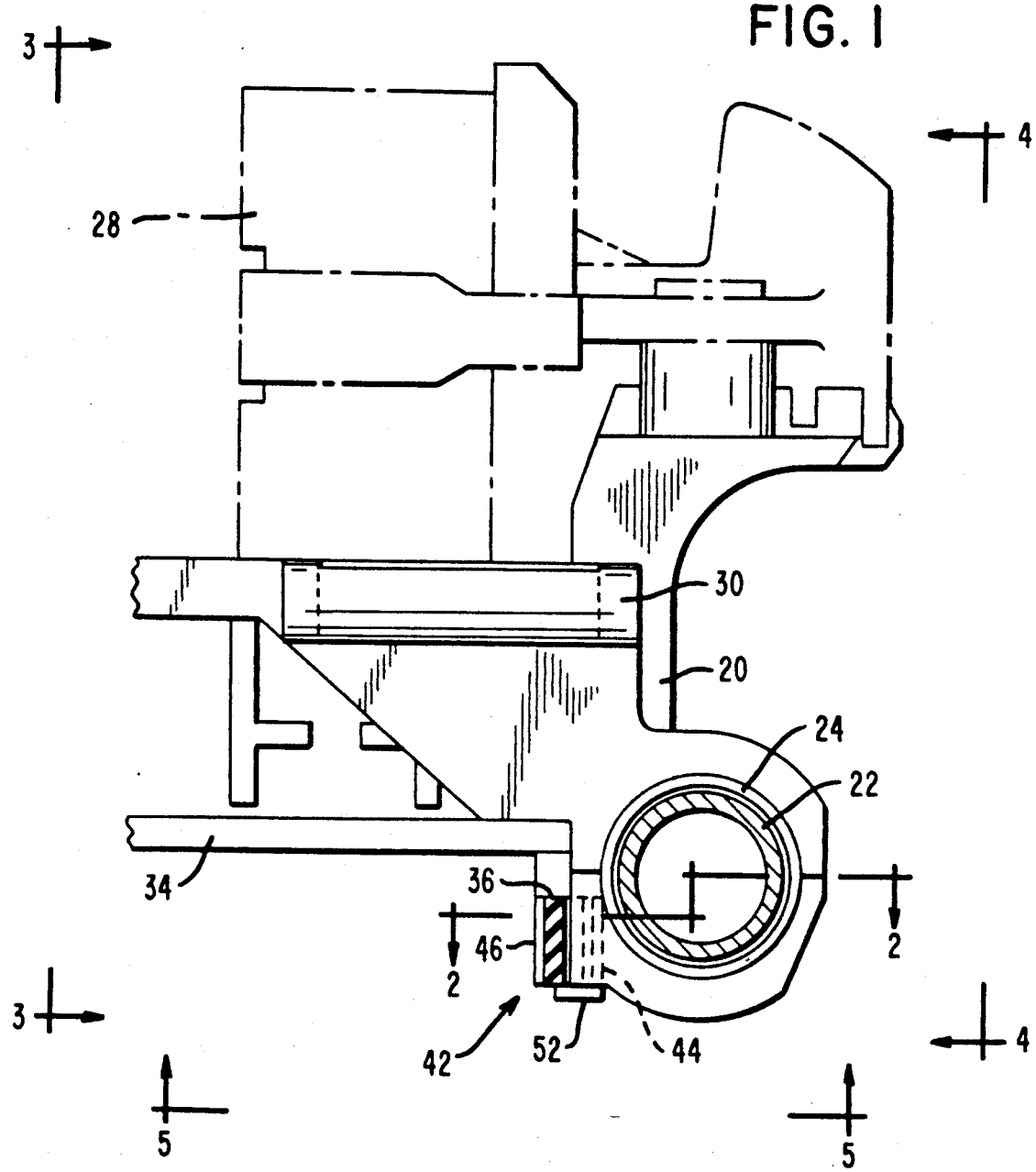
FIG. 1 is an elevation view, partially in section, showing the printhead carriage, the timing belt, and the structure for coupling the two.

Referring now to the drawings, a printhead carriage 20 is mounted for sliding movement, in a direction parallel to the line of printing of indicia on record media, on a rail 22. A pair of bearings 24, 26 placed in apertures in the carriage 20 provide the engagement with the rail 22. A printhead 28 is mounted on the carriage 20 and contains one or more solenoid-operated print wires or other suitable printing devices for accomplishing the desired printing on the record media. Since the printhead 28 forms no part of the present invention, it is shown only in phantom lines, and will not be further described. The carriage 20 also supports a heat sink (not shown) which partially surrounds the printhead 28 and provides a means for dissipating the heat generated by said printhead during operation. Latching elements 30 and 32 are provided on the carriage for retaining the heat sink in position. The carriage 20 also carries a printed circuit board 34 which contains circuitry utilized in operation of the printhead 28 and which is electrically coupled to a computer or other device which controls character selection and other signals used in printer control.

Figure 2:
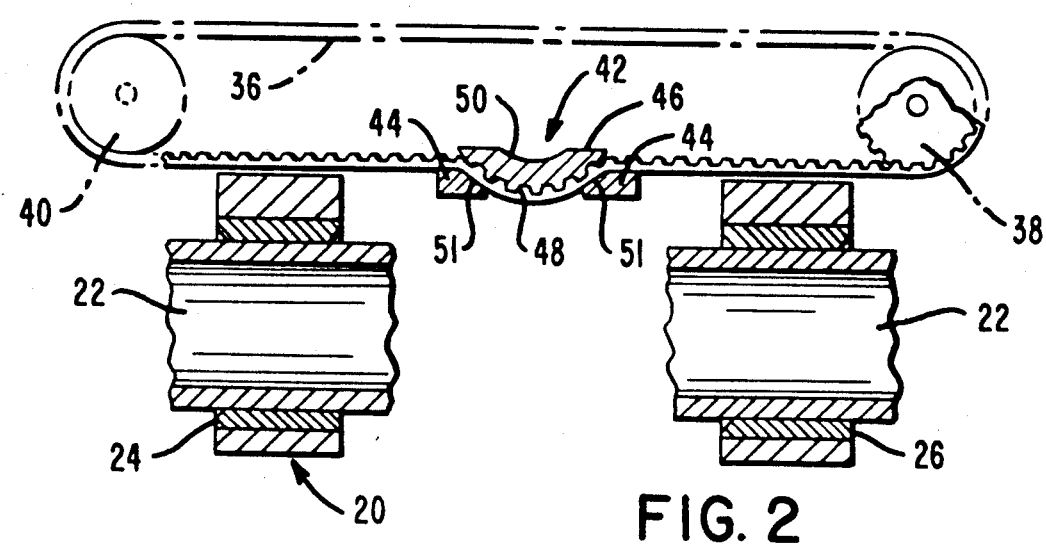
FIG. 2 is a sectional view, in a reduced scale, taken along line 2—2 of FIG. 1.
Figure 3:
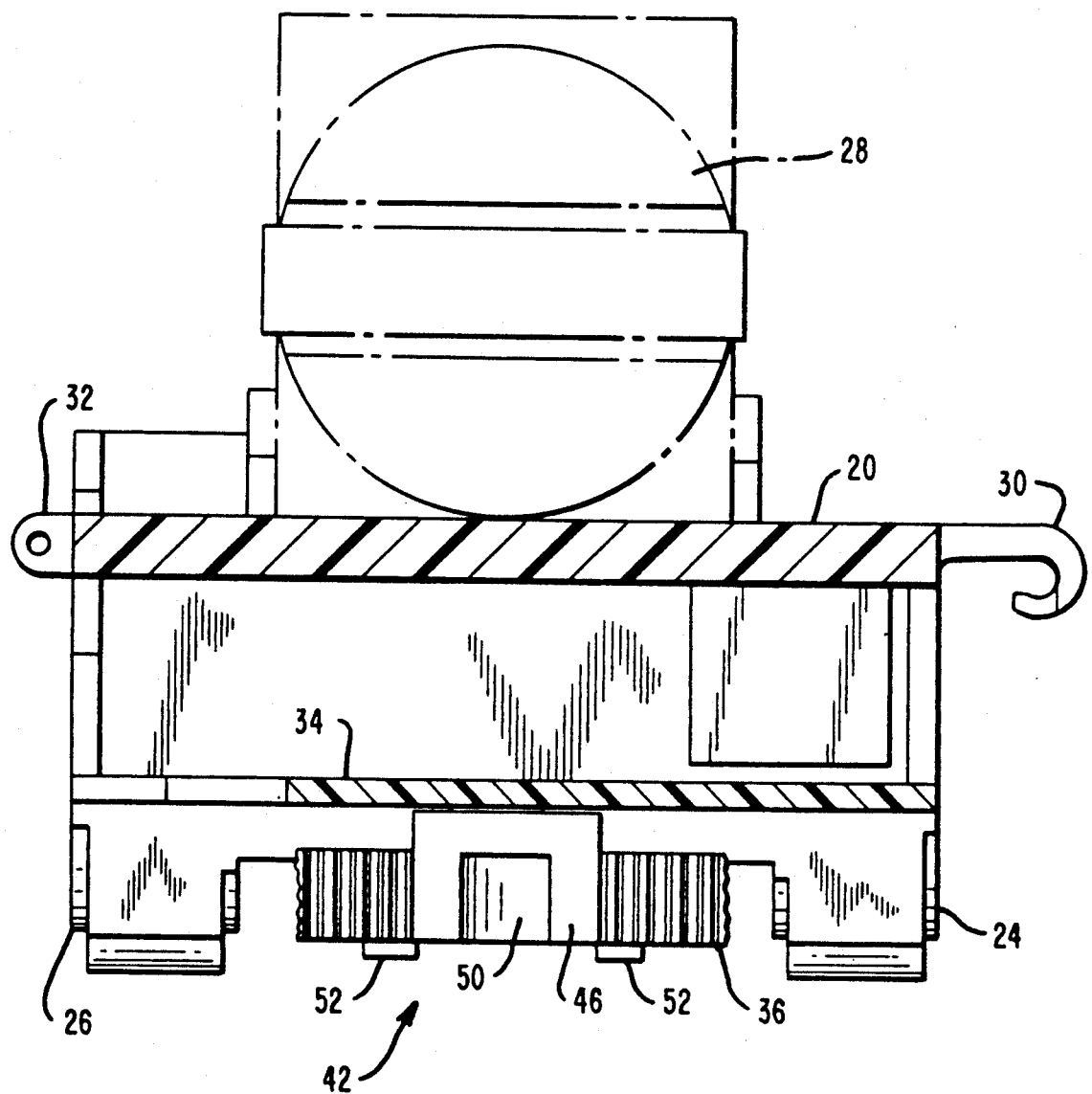
FIG. 3 is a sectional view taken along line 3—3 of FIG. 1.
Figure 4:
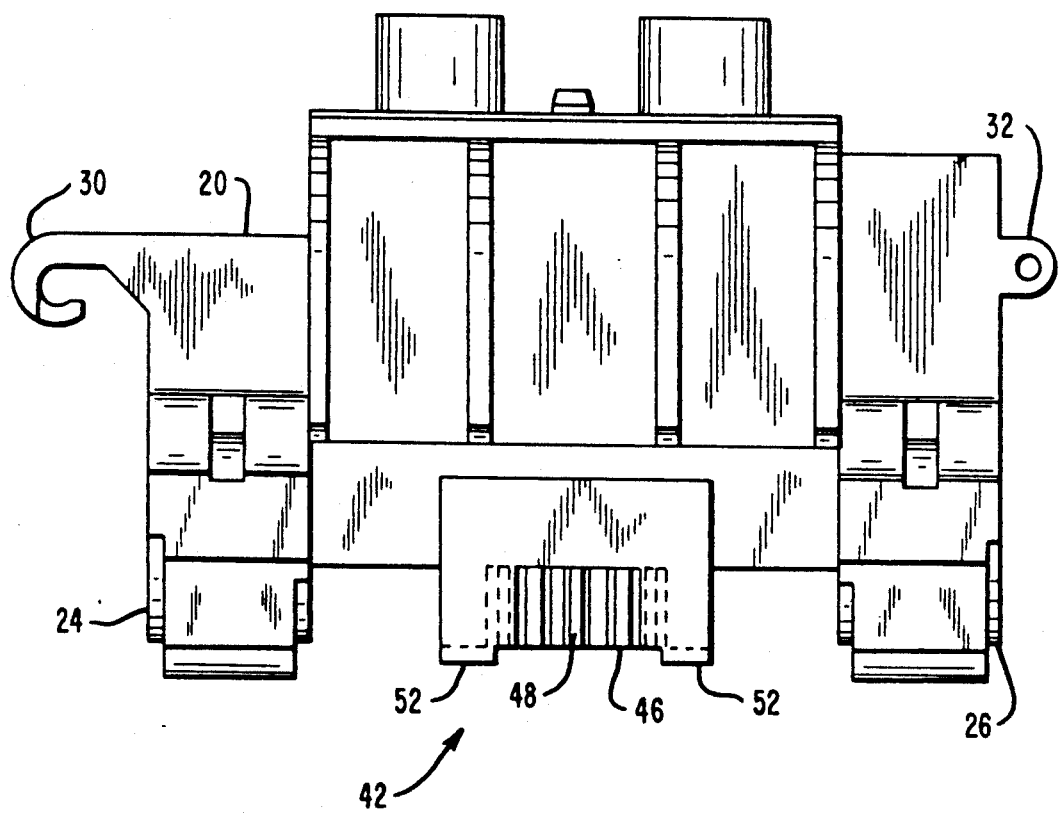
FIG. 4 is a sectional view, taken along line 4—4 of FIG. 1.

As shown in FIG. 2, the carriage 20 is driven for reciprocating transverse movement on the rail 22 by a toothed timing belt 36 which in turn is driven by a toothed gear 38, driven by a motor (not shown). The belt 36 is preferably of the endless type, and its path of movement is also defined by an idler 40, with which it engages at a distance from the gear 38, said idler gear 40 being positioned so that the major paths of movement of the belt 36 are parallel to the rail 22.

The device for coupling the belt 36 to the carriage 20 is designated generally by the reference character 42 and includes a pair of posts 44 and a central arcuate member 46. The posts 44 and the member 46 are attached to a lower surface of the carriage 20 and may be molded integrally therewith. The member 46, which may also be termed a curved toothed profile, resembles a portion of an annulus in configuration. It includes a convex surface 48 which is provided with a toothed profile that is complementary to the toothed profile of the timing belt 36, and also includes a concave surface 50 on the side of the member which faces away from the belt 36.

As may best be seen in FIG. 2, the posts 44 are of generally rectangular cross-section, with each having one corner of the rectangle being cut away to provide an angled surface 51 which is generally parallel to a portion of the convex surface 48 of member 46 to define a passageway between each post 44 and the member 46, through which the belt 36 may extend. The passageway is of slightly greater width than the width of the belt. At their bottoms, the posts 44 are provided with integral enlarged pads or ledges 52. These ledges 52 have corners 54 which extend under the passageway defined by the posts 44 and the member 46. The ledges 52 perform a retaining function to hold the belt 36 against slipping out of the coupling device 42 when the belt is loose.

Figure 5:
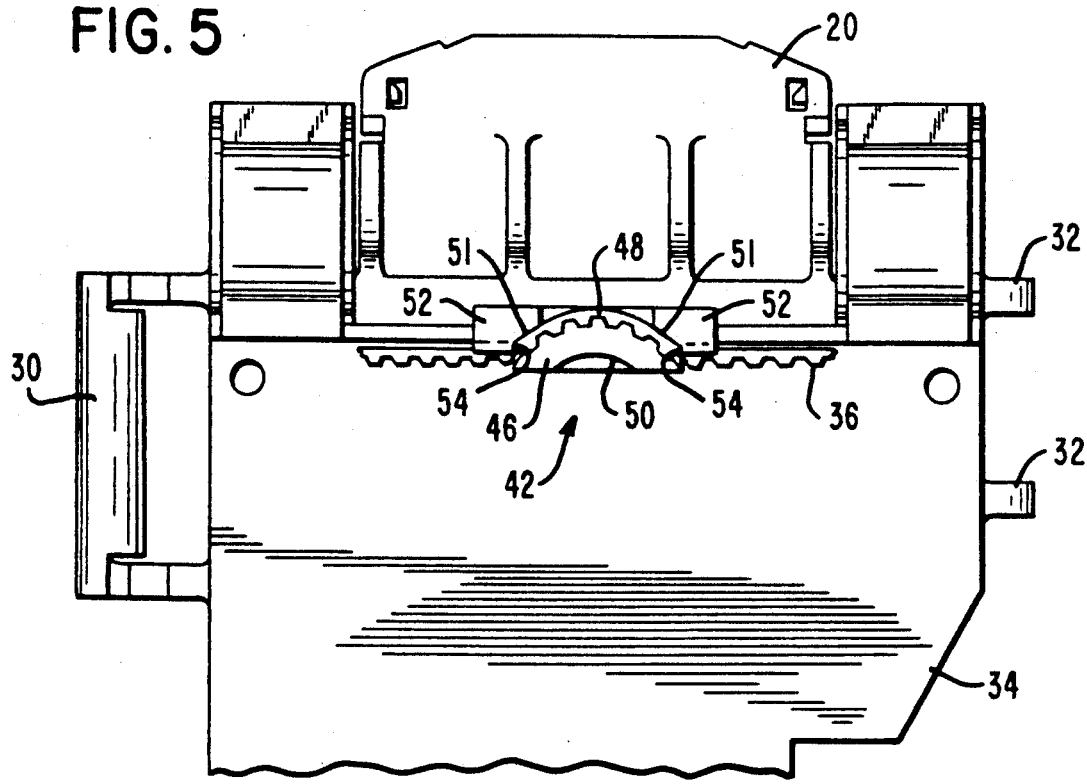
FIG. 5 is a bottom view of the printhead carriage, taken along line 5—5 of FIG. 1, showing the timing belt operatively coupled to the carriage for driving it.
Figure 6:
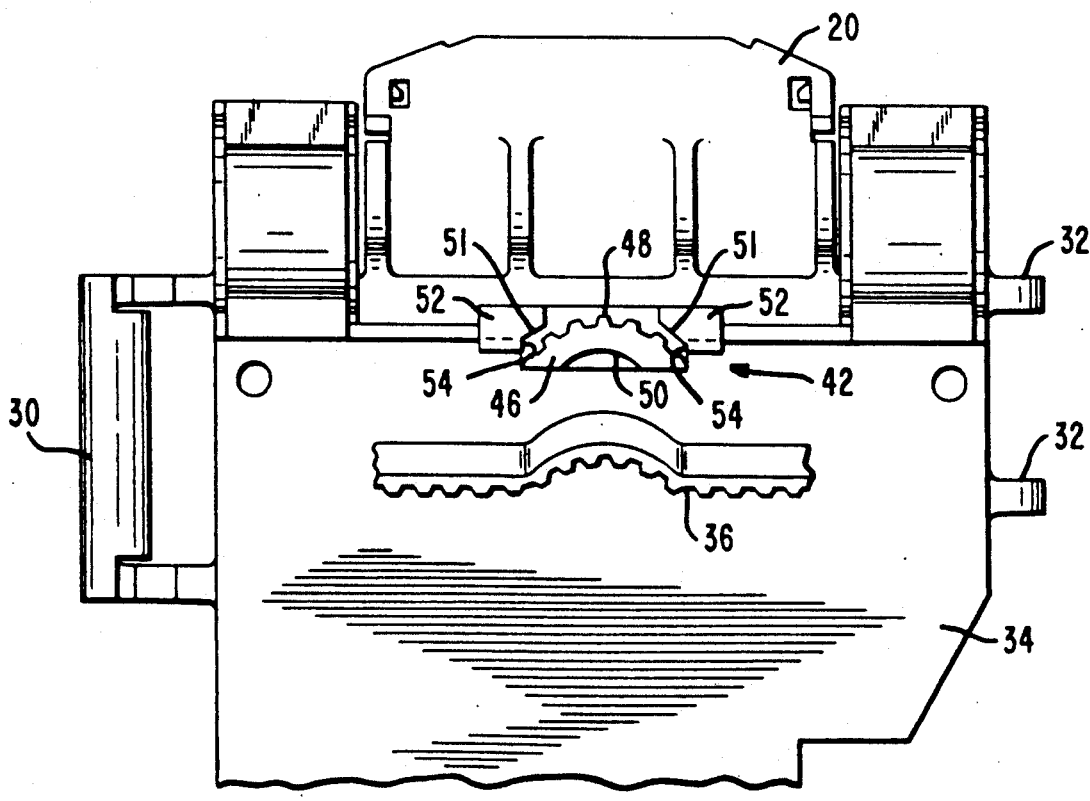
FIG. 6 is a bottom view of the printhead carriage, similar to FIG. 5, showing the timing belt removed from the coupling structure of the carriage.

The manner in which the belt 36 and the coupling device 42 are assembled can best be seen in FIGS. 5 and 6. In FIG. 6, the loose belt 36, not engaged with the gears 38 and 40, is shown as being below and separated from the coupling device 42. The teeth of the belt 36 are then aligned with the complementary recesses in the convex surface 48 of the arcuate member 46. The belt 36 is then moved upwardly, past the protruding corners 54 of the ledges 52, and into the passageways between the convex surface 48 and the surfaces 51 on the posts 44, until it is completely past and above the ledges 52. Though loose, the belt is held against falling out of the coupling device 42 by the ledges 52. When the belt is tensioned by being placed around the gears 38 and 40, it will be in the position shown in FIG. 5, and will be held in that position by its tension. Driving of the carriage 20 can then be accomplished by operating the motor (not shown) to which the gear 38 is coupled. Rotation of the gear 38 is converted by the belt 36 into linear movement of the carriage 20 for driving it in first one and then the opposite direction.

When disassembly of the belt 36 from the coupling device 42 is desired, as for example, for replacement of a worn belt, the belt is disengaged from the gears 38 and 40 and, being loose, can then be maneuvered past the ledges 52 and their corners 54, and out of the passageways formed by the convex surface 48 of the arcuate member 46 and the angled surfaces 51 of the posts 44.

It will thus be seen that the present invention provides a simple and effective means for coupling an endless belt to the carriage of a printer which does not require separate clamps or fasteners, and in which the coupling and uncoupling can be quickly and efficiently performed.

While the form of the invention illustrated and described herein is particularly adapted to fulfill the objects aforesaid, it is to be understood that other and further modifications within the scope of the appended claims may be made without departing from the spirit of the invention.

What is claimed is:

1. A printer for serial printing of indicia on record media, comprising:
   a printhead;
   a carriage to which said printhead is secured;
   supporting means on which said carriage moves for bringing the printhead successively into operative relation with different portions of the record media;
   toothed belt means for driving said carriage in transverse movement;
   drive means for driving said belt means; and
   belt engaging means on said carriage for securing the carriage to the belt means to cause said carriage to be driven by said belt means, said belt engaging means comprising an arcuate segment having a surface complementary to the teeth on said belt means for engagement therewith; a pair of posts, each post having two ends and being secured at one of said ends to said carriage, one of said posts being positioned to either side of the arcuate segment; and a pair of ledges, one ledge secured to the other end of each post in perpendicular relationship to said post, said ledges being spaced from said carriage, said posts and said segment defining a passageway therebetween for entry and removal of the toothed belt means, each ledge extending under said passageway, so that when said belt means is not under tension, it is retained in position by the ledges on the posts against movement in a direction away from the carriage.

2. The printer of claim 1, in which the spacing between the segment and each post is slightly larger than the thickness of the belt means to enable said belt means to be placed therebetween.

3. The printer of claim 1, in which the posts and segment are secured to a lower surface of the printhead carriage.

4. The printer of claim 3, in which the posts and the segment are molded integrally with said printhead carriage.

5. The printer of claim 3, in which the segment is located to the rear of the posts and has a convex surface facing toward said posts.

6. The printer of claim 5, in which said ledges are located below the bottom surface of said segment.

7. The printer of claim 6, in which said ledges are positioned generally outwardly of said segment.

8. The printer of claim 1, in which the segment comprises a molded tooth profile conforming to the tooth profile of the toothed belt means.

* * * * *